June 21, 1927.
J. R. OISHEI
1,633,282
REAR VIEW MIRROR
Filed May 15, 1924
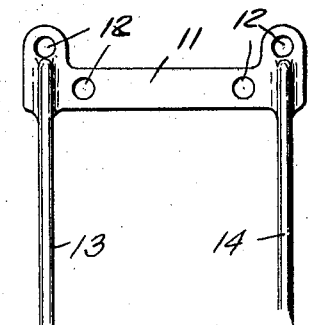
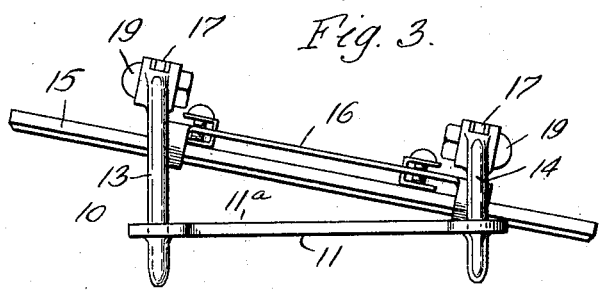
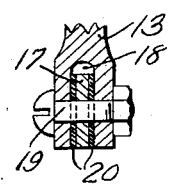
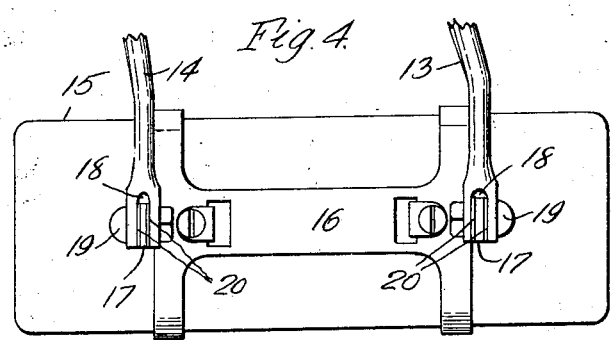
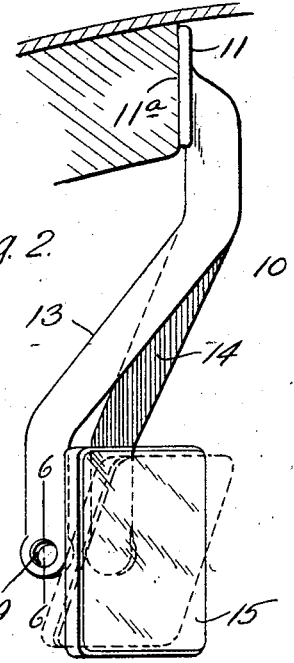
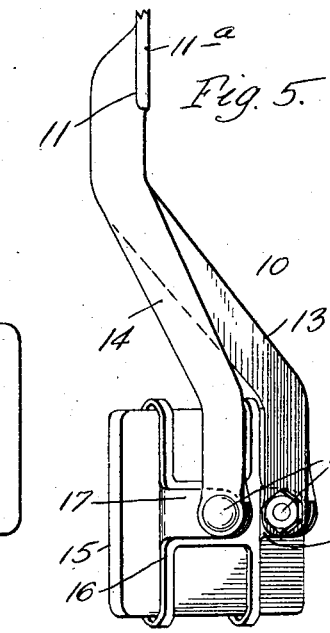
INVENTOR
John R. Oishei
by Parker, Prochnow & Beau.
ATTORNEYS.

Patented June 21, 1927.

1,633,282

UNITED STATES PATENT OFFICE.

JOHN R. OISHEI, OF BUFFALO, NEW YORK.

REAR-VIEW MIRROR.

Application filed May 15, 1924. Serial No. 713,519.

This invention relates to rear vision mirrors for vehicles.

In certain motor vehicles of the closed or sedan type, the location of the rear windows thereof is such that it is necessary to provide a rear view mirror, the reflecting portion of which is positioned a considerable distance below the upper frame bar of the windshield. Further, in order that substantially the full surface of the mirror may be used for reflection, it is desirable that the mirror be placed in front of and at one side of the driver of the vehicle instead of directly in front of the driver. In order to obtain proper reflection under these conditions, it is necessary that the reflecting surface of the mirror be inclined with respect to the windshield or other transversely extending parts at the front of the vehicle.
It is further desirable that devices of this kind be constructed so that they will not readily vibrate, the reflecting surface remaining substantially motionless when the device is in use. Devices have been proposed for this purpose, some comprising a single articulated or jointed arm adapted to be supported on a part of the vehicle and having a mirror supported at its lower extremity. In these devices, there is considerable vibration of the mirror. Other devices have included pairs of articulated or jointed arms. These devices are difficult to adjust and the articulated arms permit undesirable movement of the glass or reflecting surface, thereby getting out of proper reflecting range or distorting the reflected image. Further, the devices must be easy of attachment and preferably comprise few parts capable of being manufactured at a small cost.

The objects of the present invention are to provide a mirror for motor vehicles in which the glass or reflecting surface is firmly supported a distance below the point of attachment of the device to the vehicle; also to provide a rear vision mirror consisting of few parts, in which the mirror is disposed a distance below the point of attachment to the vehicle; also to provide a rear vision mirror of the drop type which will not vibrate; also to provide improvements in rear vision mirrors for vehicles in the respects hereinafter set forth and claimed.

In the drawings:

Fig. 1 is a front elevation of a mirror embodying the present invention.

Fig. 2 is an end elevation thereof.

Fig. 3 is a top plan view thereof.

Fig. 4 is a rear elevation of a portion thereof.

Fig. 5 is an end elevation thereof.

Fig. 6 is a section on line 6—6, Fig. 2, on an enlarged scale.

The mirror of the present invention comprises, generally, a bracket, described hereinafter, having parts for attachment to a frame member of the vehicle or to a part of the windshield, a mirror plate or reflecting surface, and a holder part on the mirror plate or reflecting surface whereby the mirror is mounted on the bracket.

In the embodiment of the invention shown, 10 designates the bracket which has an attaching portion 11 which is adapted to be secured to a part of the vehicle or a part of the windshield. The attaching portion is preferably provided with a plane face 11$^a$ adapted to contact with a transverse part of the vehicle or windshield frame. As shown in the drawings, this attaching part may be provided with holes 12 whereby it may be readily and firmly secured to the vehicle by means of suitable bolts or screws, whereby the attaching portion is firmly secured. 13 and 14 designate a pair of drop arms. These drop arms are preferably integral with the attaching portion of the bracket and the lower ends of the arms are provided with offset bearing portions. The arms are preferably rigid and, as shown, the offset bearing parts may be provided by offsetting the ends of the arms. The drop arms, as shown, preferably extend downwardly and forwardly of the vehicle to points forward or in front of the vertical plane of the attaching portion face, the bearing portion of one arm being in advance of the other to provide the offset feature and at least one end of the reflector or mirror plate being forward or in front of the vertical plane of the attaching portion face. The bracket, including the attaching portion and the rigid arms, may be readily cast of suitable material, whereby a sufficiently strong and rigid fixture of sufficient weight to lessen vibrations of the mirror which it supports, is cheaply produced.

15 designates the reflecting surface which may be a mirror of any suitable kind, and the mirror is connected to the drop arms of the bracket by suitable means. For this purpose, in the embodiment shown, there is provided a holding member 16 having fingers which embrace the edges of the mirror plate and having rearwardly extending ears or bracket portions 17 which are adapted to be connected to the drop arms of the bracket. The ears or bracket portions 17 of the mirror plate are preferably pivotally secured to the lower ends of the bracket drop arms, thus disposing the mirror a considerable distance below the attaching portion of the bracket. In the embodiment shown, the lower ends of the bracket drop arms are slotted as at 18, and the holder plate ears or brackets extend into these slotted portions and are pivotally secured therein by means of transversely extending bolts 19. 20 designates friction washers interposed between the holder plate ears and the slotted arms of the bracket, whereby the mirror plate may be pivotally turned on the lower end of the bracket arms and is frictionally held by said washers in any desired angular position.

The bearing portions at the lower ends of the bracket drop arms being offset relatively to one another and positioned forward or in front of the vertical plane of the attaching portion face, provide a pivotal axis for the mirror at an inclination to the face plane of the attaching bracket. This results, when the attaching portion of the bracket is secured to a transversely extending part of the front frame of the automobile or of the windshield, in the face plane of the mirror being disposed in a plane at an angle or inclination to the front of the vehicle and renders it possible to attach the mirror in front of and at one side of the operator of the vehicle, thereby obtaining a full reflecting surface. The pivotal connection between the bracket drop arms and the mirror permit the mirror to be swung or turned on its substantially horizontal axis.

The bearing portions for pivotal movement of the mirror being offset so that the pivotal axis of the mirror is at an angle or inclination to the transverse plane of the vehicle on the mirror supporting bracket results, when the mirror is turned from the normal vertical position, shown in full lines in Fig. 2, in portions of the mirror projecting transversely beyond the space they normally occupy in vertical position. Thus the mirror not only permits vertical adjustment to reflect images of objects of different heights or different distances in rear of the vehicle, but transverse adjustment as well to reflect images of objects more or less at one side or the other of the lengthwise center line or plane of the vehicle.

I claim as my invention:

1. In a rear view mirror, a reflecting surface, a supporting member therefor, said supporting member comprising an attaching portion adapted to be secured to a support on a vehicle, a pair of spaced, rigid drop arms extending from the outer face of said attaching portion downwardly and under the latter, the lower end of one of said arms extending forwardly beyond the end of the other arm for supporting the reflecting surface beneath the attaching portion so that the latter will overhang the same, bearing portions in the ends of said arms forwardly of the vertical plane of said attaching portion, and means pivotally connecting said reflecting surface to said arms for pivotal movement about said bearing portions.

2. In a rear view mirror for vehicles, a one-piece bracket having an attaching portion with a face adapted to contact with a transverse part of the vehicle and to be secured thereto, and a pair of spaced, rigid drop arms, one of said arms extending downwardly and forwardly beyond the vertical plane of said attaching portion face and the other arm extending downwardly and forwardly a greater distance beyond the vertical plane of said attaching portion face than said first-mentioned arm below said attaching portion, a reflecting surface, and a holder plate having parts secured to said reflecting surface and parts pivotally secured to the lower ends of said drop arms and supporting the reflecting surface so that said arms and said attaching portion overhang the same.

3. In a rear view mirror for vehicles, a one-piece bracket having an attaching portion with a face adapted to contact with a transverse part of the vehicle and to be secured thereto, and having a pair of spaced, rigid drop arms extending downwardly a distance below and under said attaching portion to the opposite side thereof, bearing portions adjacent the lower ends of said drop arms on said opposite side of said attaching portion, said bearing portions lying in a plane at an angle to the plane of said attaching portion face and forward of the vehicle beyond the vertical plane of said attaching portion face, a reflecting surface, and a holder plate having parts secured to said reflecting surface and parts pivotally secured to said bearing portions.

4. In a rear view mirror, a reflecting surface, a bracket having an attaching portion with a forward face adapted to be secured against a transverse part of a vehicle and an outer face, and a pair of rigid drop arms extending from the outer face of said attaching portion downwardly and beneath the latter and terminating in advance of said forward face, said arms being substantially in parallel planes extending perpendicular to the faces of said attaching portion, the lower portion of one arm extending beneath the attaching portion at a greater angle of inclination than the companion arm whereby the former terminates in a vertical plane spaced further from the vertical plane of said attaching portion than the latter arm so that a common pivotal axis through the free ends of said arms will be inclined relative to the plane of said attaching portion, and means for adjustably mounting said reflecting surface on the common pivotal axis whereby the reflecting surface will be supported at an inclination to said attaching portion.

JOHN R. OISHEI.